Figure 1:
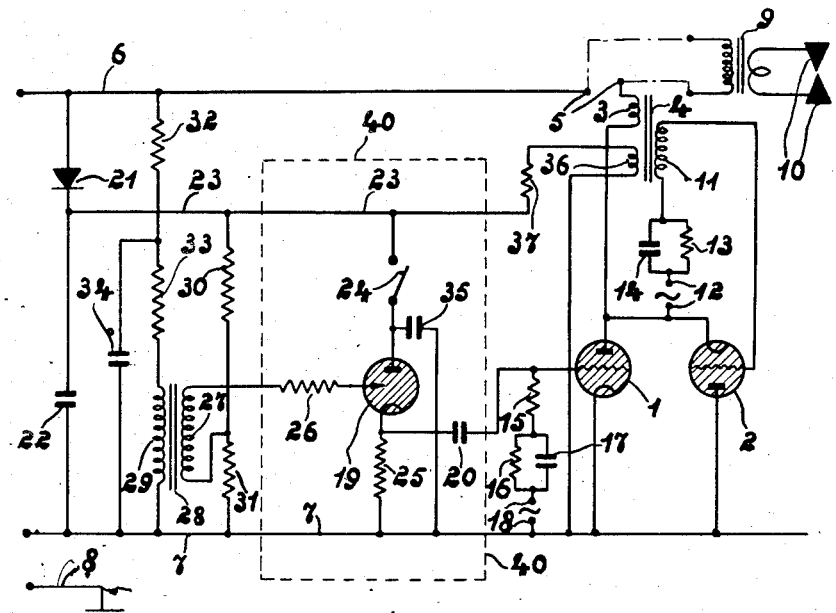

Inventors
Gerald Offley Crowther
Leon Henry Light
By Fred M. Vogel
Agent

United States Patent Office 2,775,723
Patented Dec. 25, 1956

2,775,723

ELECTRIC CIRCUIT ARRANGEMENT FOR SUPPLYING A LOAD WITH ALTERNATING CURRENT

Gerald Offley Crowther, New Malden, England, and Leon Henry Light, Glasgow, Scotland, assignors to Hartford National Bank and Trust Company, Hartford, Conn., as trustee Application August 19, 1953, Serial No. 375,186

Claims priority, application Great Britain August 20, 1952

7 Claims. (Cl. 315—251)

This invention relates to electric circuit arrangements for supplying a load with one or more half cycles or parts thereof of alternating current. Such a load may comprise resistance welding apparatus where it is desirable, in order to obtain consistently good welds, to apply current to the weld for a predetermined and fairly accurately measured time interval.

Broadly, there are two types of circuit arrangements for measuring and determining the time during which current flows to a load, namely analogue and digital. The present invention relates to a circuit arrangement of the digital type.

According to one aspect of the invention an electric circuit arrangement for supplying a load with a half cycle or a part thereof of an alternating current supply, at each time of operating of the circuit arrangement, comprises a first electric discharge tube whose effective impedance is in series with the load, an electric discharge path and means for causing the discharge path to change from being non-conductive to conductive or vice versa in dependence upon a voltage derived from the alternating current supply whereby the change produces an impulse which enables the first discharge tube to conduct for one-half cycle only for each time of operation of the circuit arrangement.

According to another aspect of the invention an electric circuit arrangement for supplying a load with a plurality, N, of successive half cycles of like sign or parts thereof of an alternating current supply, at each time of operation of the circuit arrangement, comprises a first electric discharge tube whose effective impedance is in series with the lead, N electric discharge paths and means for causing, in succession, each of said discharge paths to change from being non-conductive to conductive or vice versa in dependence upon successive cycles of a voltage derived from the alternating current supply whereby the successive changes produce N impulses which enable the first discharge tube to conduct N times for each time of operation of the circuit arrangement.

Each half cycle of current supplied to the load may be added to, to make a full cycle by the addition of a second discharge tube, reversely connected in parallel with the first discharge tube, together with means for causing the second tube to conduct for a time interval not greater than the half cycle immediately following each cessation of current in the first tube, which next half cycle is of opposite polarity.

The discharge path or paths may be gaseous or in vacuo and where gaseous each path may be associated with a cold cathode. Each path may be in a separate tube or several paths may be in one tube.

Figure 2:
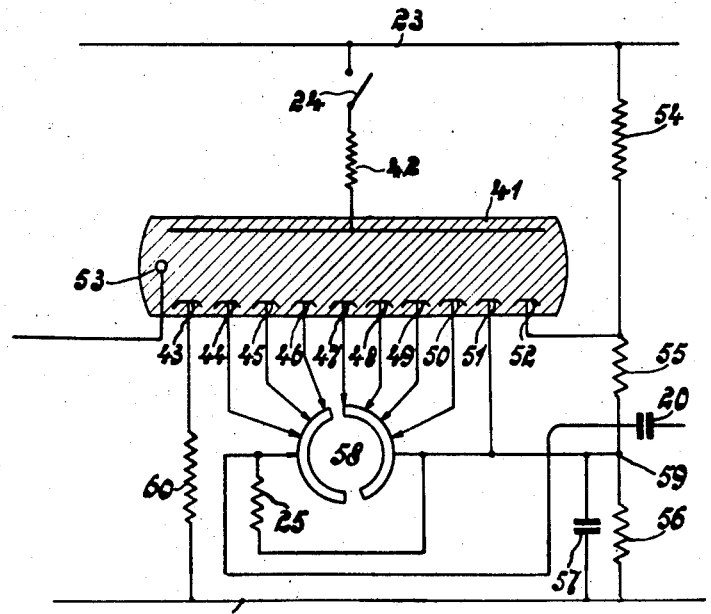

In order that the invention may be more clearly understood and readily carried into effect, two embodiments will now be described by way of example with reference to the accompanying drawing in which:

Figure 1 is a schematic diagram of a circuit arrangement connected to spot welding apparatus and arranged to supply a cycle or substantial part thereof of an alternating current supply at each operation of the circuit arrangement; and Figure 2 is a schematic diagram of a modification which may be made to the circuit arrangement of Figure 1 so that it is capable of supplying one or more cycles or substantial parts thereof of an alternating current supply at each operation of the circuit arrangement.

Referring to Figure 1, reference numeral 1 is a thyratron connected in series with a winding 3 of a peaking transformer 4 and output terminals 5, the series combination being connected across the alternating current supply of which lead 6 is live, lead 7 is neutral and lead 8 is ground. To the output terminals 5, there is connected the primary of a spot welding transformer 9 to the secondary of which are connected the spot welding electrodes 10.

In parallel with thyratron 1 is reversely connected thyratron 2, the grid of which is connected to a winding 11 of the peaking transformer 4. The other end of winding 11 is connected, via a parallel combination of a resistor 13 and a capacitor 14, to terminals 12 which have applied to them an alternating voltage in anti-phase to the alternating voltage appearing between anode and cathode.

The grid of thyratron 1 is connected to the neutral line 7 via a resistor 15, a parallel combination of resistor 16 and capacitor 17 and terminals 18, and is connected to the cathode of a cold cathode gaseous discharge tube 19 via a capacitor 20. To the terminals 18, there is applied an alternating voltage in anti-phase to the anode-cathode voltage.

By means of a rectifier 21 and a capacitor 22 a high tension line 23 is provided with a direct current voltage, which voltage is applied to the anode of tube 19 when an initiating switch 24 is closed. Connected between the cathode of tube 19 and the neutral line 7 is a resistor 25. The ignition electrode of the tube 19 is connected via a resistor 26 to the secondary winding 27 of another peaking transformer 28. The end of secondary winding 27 remote from the ignition electrode is connected to the junction of resistors 30 and 31 which resistors form a potential divider between the high tension line 23 and the neutral line 7. This arrangement biases the ignition electrode to a voltage insufficient to cause the tube 19 to strike but of sufficient value that when a positive going pulse is obtained from secondary winding 27, the combination of the pulse and the bias voltage causes the tube 19 to strike, if it is not already struck.

The primary 29 of peaking transformer 28 is supplied with current from the alternating supply via a limiting resistor 33 and a phase shifting network comprising a resistor 32 and a capacitor 34. The time during the cycle of the alternating supply at which a pulse occurs across the secondary 27 may be controlled by said phase shifting network. Between the anode of the tube 19 and the neutral line 7, a capacitor 35 is connected to prevent unreliable operation which might otherwise occur due to bouncing of the contacts of the initiating switch 24.

The current flowing through the primary 29 of peaking transformer 28 is sufficiently large to saturate the core for a considerable part of the cycle so that a voltage only appears across the secondary when the primary current passes through zero. Thus a positive and a negative short duration pulse appears at the ignition electrode of the tube 19 for each cycle of the alternating current supply, the positive pulse occurring during the time the alternating supply voltage is positive.

Now when the initiating switch 24 is closed, by a foot pedal for instance, the next positive pulse causes tube 19 to strike and because of the current flow through resistor 25 the cathode voltage rises. The tube 19 remains struck until the initiating switch 24 is opened while the cathode rise in voltage produces a positive pulse at the grid of thyratron 1. This pulse overcomes the bias provided by the alternating voltage at terminals 18 plus the negative bias produced across the resistor 16 and capacitor 17 by grid current when the anode is negative, and thyratron 1 conducts for the remainder of the half cycle thereby supplying the load, which in this case is a welding transformer 9, with current. In supplying the load, the current flows through winding 3 of peaking transformer 4 and when this current ceases at the end of the half cycle a pulse is obtained from the winding 11 which causes thyratron 2 to conduct over the next half cycle. Thus current is supplied to the load for most of a whole cycle. In order to obtain a larger pulse from winding 11, the core of the peaking transformer 4 is premagnetized to saturation in a direction opposite in sign to that required for producing the required pulse across winding 11. The premagnetization is obtained by means of a winding 36 which passes a direct current, via a resistor 37, from the high tension line 23 to the neutral line 7. Thus the core is used from saturation in one direction to saturation in the other instead of from zero to saturation. Such an arrangement of transformer and second thyratron is sometimes referred to as a "follow-on-transformer and tube."

Since tube 19 remains struck until the initiating switch 24 is opened only one cycle of current is supplied. After the initiating switch 24 has been opened the circuit arrangement is ready for the next time of operation.

Where it is desired to use a vacuum tube in the place of the gaseous tube 19 it is possible to use an oscillator which is biased back on the control grid so that it is not oscillating but is on the verge of oscillation. If now the pulse output of peaking transformer 28 is applied to the control grid of the oscillator the bias is overcome so that the oscillator breaks into oscillation and continues to oscillate until the anode supply voltage is interrupted. The increase of current flowing through the oscillator tube during oscillation may flow through a resistor in the cathode lead, for example, so that a positive pulse is produced at the grid of thyratron 1 in order that thyratron 1 may conduct. With circuits of this type it is desirable to suppress the negative pulses from the peaking transformer 28 with, for example, a diode. Other trigger circuits, such as a biased multivibrator, may be used with a slight rearrangement of the circuit.

When it is desired to supply one or more cycles of current to the load, a circuit similar to Figure 1 may be used except that the circuitry contained in the dotted-line rectangle 40 is replaced by the circuitry of Figure 2 in which components having similar functions to those described with reference to Figure 1 are given the same reference numerals.

A multi-path cold cathode gaseous switching tube is designated 41, the anode of which is connected to the high tension line 23 via a resistor 42 and an initiating switch 24. The tube 41 also comprises ten cathodes 43 to 52 inclusive and a ring 53 of transfer cathodes. The ring 53 is connected to the secondary winding 27 of peaking transformer 28 (Figure 1), the terminals of the secondary winding 27 having been reversed so that a negative pulse is applied to the ring 53 when the alternating supply voltage is positive. Cathode 43 is connected via a resistor 60 to the neutral line 7 and cathode 52 is connected to the junction of resistors 54 and 55, which resistors together with a resistor 56 form a potential divider chain between the high tension line 23 and the neutral line 7. Across resistor 56 is connected a smoothing capacitor 57.

Cathode 51 is connected to the junction 59 of resistors 55 and 56.

Cathodes 44 to 50 are connected to a switch 58 which makes it possible to determine how many of these cathodes are connected to junction 59 via resistor 25 and how many are directly connected to junction 59. In the case shown cathodes 44, 45 and 46 are connected to junction 59 via resistor 25.

The end of resistor 25 remote from the junction 59 is connected via a capacitor 20 to the grid of thyratron 1 (Figure 1).

When the initiating switch 24 is closed, a discharge strikes between the anode and cathode 43, since this cathode has the most negative voltage. The next negative pulse applied to the ring 53 causes the discharge to transfer to cathode 44 and as a result of the discharge current flowing through resistor 25 a pulse is produced which, via the capacitor 20, causes thyratron 1 to conduct. Upon the arrival of the next negative pulse upon the ring 53 the discharge transfers to cathode 45, and so on until the discharge arrives at cathode 51. The arrival of another negative pulse upon the ring 53 attempts to transfer the discharge to cathode 52, but because of the much lower anode-cathode voltage of cathode 52 the discharge does not transfer but falls back onto cathode 51 and thus any further transfer of the discharge is prevented.

It will be seen from Figure 2 that the discharge currents of cathode 44, 45 and 46 flow through resistor 25 and thus three pulses are supplied to thyratron 1 causing three cycles of current to be supplied to the load. By operation of the switch 58 it is possible to select the number, from one to seven, of cycles of alternating current which may be supplied to the load. On opening the initiating switch 24 the circuit arrangement becomes available for another time of operation. It is obvious that similar tubes having more or less cathodes or combinations of such tubes may be used.

When using a tube of this kind the end of winding 27, which is shown in Figure 1 to be connected to the junction of resistors 30 and 31, may alternatively be returned to the junction of resistors 54 and 55 and then resistors 30 and 31 may be dispensed with.

Instead of using a multi-path tube, several separate tubes may be used. It is also possible to use other switching tubes, for example tubes of a non-gaseous type as described in Philips Research Reports, volume 5, February 1950, pages 6–22 and in volume 7, April 1952, pages 81–111. These counter tubes are of the cathode ray tube type in which the electron beam may be fixed along any one of a number of discrete paths, the beam being moved from one path to the next by means of an impulse. Tubes similar to the selector tube and/or counting tube as mentioned in sections 5 and 6 respectively of the first mentioned reports may be used and the deflection voltage may be provided in the manner described, or alternatively a diode-pump may be used. The pulses necessary for causing the thyratron 1 to become conductive may be obtained from a resistor or resistors, or transformer or transformers, connected in series with the anode or anodes.

It is to be understood that the invention is not limited to the details disclosed but includes all such variations and modifications as fall within the spirit of the invention and the scope of the appended claims.

What is claimed is:

1. An electric circuit arrangement for supplying a load with half cycle intervals or a part thereof of an alternating current supply, at each time of operation of the circuit arrangement, comprising a first electric discharge tube whose effective impedance is in series with the load, a second electric discharge path, said second discharge path being adapted to be rendered selectively conductive and nonconductive, means coupled to said alternating current supply and to said discharge path for selectively switching said discharge path from one of said conduction conditions to the other of said conduction conditions, means further coupled to said discharge path for maintaining the conduction condition initiated by said switching means, and means coupled to said discharge path and responsive to the change in the conduction thereof for initiating conduction in said first electric discharge tube whereby said first discharge tube is rendered conductive for one half cycle only upon the change in conduction in said discharge path.

2. An electric circuit arrangement as set forth in claim 1, wherein said second discharge path includes a plurality of channels, each of said channels being adapted to be rendered selectively conductive and nonconductive, and wherein said switching means includes means for successively switching each of said channels from one of said conduction conditions to the other of said conduction conditions.

3. An electric circuit arrangement as set forth in claim 2, further including a single envelope enclosing said plurality of channels.

4. An electric circuit arrangement as set forth in claim 1, wherein said discharge path is gaseous.

5. An electric circuit arrangement as set forth in claim 2, wherein said second discharge path further includes a cold cathode associated with each channel.

6. An electric circuit arrangement as set forth in claim 1, further including a second electric discharge tube connected across said first electric discharge tube in phase opposition thereto, and means coupling the output of said first tube to the input of said second tube and responsive to the change in conduction in said first tube to initiate conduction in said second tube for a time interval not greater than a half cycle immediately following each conduction interval in said first tube, said immediately following half cycle being of opposite phase to the phase of the half cycle occurring during conduction in said first tube.

7. An electric circuit arrangement as set forth in claim 6, wherein said tubes are each constituted by a thyratron.

References Cited in the file of this patent

UNITED STATES PATENTS

| | | |
|---|---|---|
| 2,248,929 | Adler | July 15, 1941 |
| 2,263,773 | Gulliksen | Nov. 25, 1941 |
| 2,451,898 | Wyman | Oct. 19, 1948 |
| 2,473,237 | Bivens | June 14, 1949 |

FOREIGN PATENTS

| | | |
|---|---|---|
| 851,093 | France | Sept. 25, 1939 |